Jan. 10, 1956 L. H. DAWSON 2,730,712

FREQUENCY MODULATED RADAR SYSTEM

Filed Oct. 9, 1950

Inventor:
Leslie Howard Dawson;
By his attorneys,
Baldwin & Wight

United States Patent Office 2,730,712

Patented Jan. 10, 1956

2,730,712

FREQUENCY MODULATED RADAR SYSTEM

Leslie Howard Dawson, Chelmsford, England, assignor to Marconi's Wireless Telegraph Company, Limited, London, England, a company of Great Britain Application October 9, 1950, Serial No. 189,268

Claims priority, application Great Britain October 20, 1949

5 Claims. (Cl. 343—14)

Figure 1:
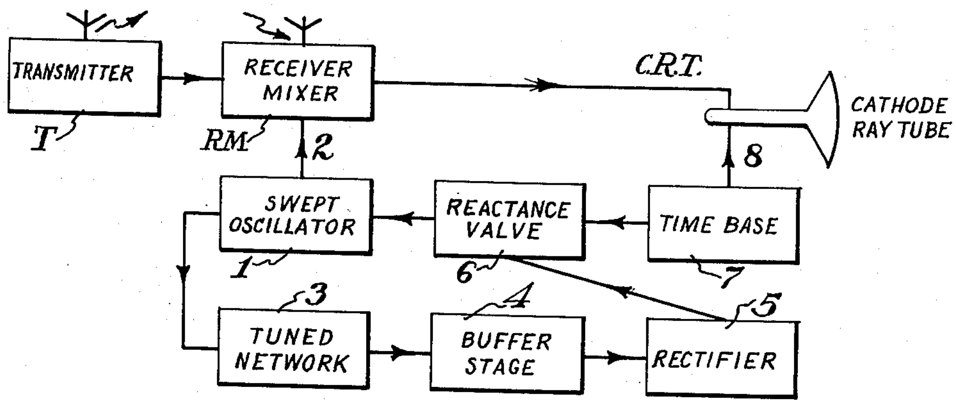

This invention relates to frequency modulated radar systems of the panoramic receiver type and more specifically to such systems of the kind in which the receiver arrangements include what will herein be termed "swept oscillators" that is to say, variable frequency oscillators which are required to be varied in frequency with respect to a limiting frequency defining one end of the range of variation. More usually, though not necessarily, a swept oscillator is required to be varied in frequency between two predetermined limiting frequencies.

The main object of the invention is to provide improved frequency modulated radar systems of the panoramic receiver type in which at least one of the limiting frequencies of the swept oscillator shall be automatically accurately maintained at a predetermined value despite possible "drift" producing undesired changes such as changes in ambient temperature, or changes in cathode heater voltage or anode D. C. voltage supplied to a valve in the oscillators.

According to this invention a frequency modulated radar system of the panoramic receiver type includes a swept oscillator type circuit arrangement comprising a resonant circuit or network tuned to a frequency closely adjacent a predetermined desired limiting frequency for the swept oscillator, means for feeding output from said oscillator to said circuit or network, means for deriving a control potential from said circuit or network, and means for utilising said control potential to correct the frequency of said oscillator so that when said oscillator is approaching said limiting frequency it is subjected to the correcting control potential and thereby substantially prevented from passing said limiting frequency.

The control potential is preferably a D. C. potential derived by rectifying output from the resonant circuit or network and is utilised to effect its correcting control electronically. Where the oscillator is itself of the so-called reactance valve type the D. C. potential may be used as control bias either on the oscillator valve itself or on a separate reactance valve associated with the oscillator valve. Where, as may occur, the oscillator frequency is swept mechanically e. g. by mechanically varying a variable condenser in the oscillator tank circuit, a separate reactance valve is preferably associated with the oscillator proper and the correcting D. C. potential used as control bias on said separate reactance valve.

The resonant circuit or network may comprise one or more tuned circuits or it may be of the piezo-electric type.

The circuit supplying the correcting control potential should, of course, have such a time constant or be otherwise so designed that the correction can follow the comparatively slow ambient variations which would otherwise cause drift of the limiting frequency without, however, producing any appreciable control variation as a result merely of the normally much quicker (desired) frequency variations due to sweeping over the range of frequencies away from the limiting frequency. In practice no difficulties are experienced in satisfying this requirement.

In FM radar systems a continuous wave, which is cyclically and periodically modulated in frequency between predetermined limits in accordance with a predetermined law, is transmitted to and reflected from targets and the reflected or echo energy is mixed with energy then being transmitted to provide beat notes whose frequencies will, of course, be proportional to the ranges i. e. distances away, of the targets. These beat notes are analyzed by means of a panoramic receiver in which oscillations from a swept oscillator, whose frequency is varied between predetermined limits are mixed with the beat notes to provide an output which is amplified by an amplifier of predetermined acceptance band and then utilized for target display purposes.

Now in such a radar system the beat-notes produced from targets which are at close ranges will extend down to relatively low frequencies, and, in consequence, it is necessary that the swept oscillator frequency approach fairly closely the predetermined acceptance band of the amplifier—usually called the intermediate frequency (I. F.) amplifier. This invention involves that, if accurate range finding is to be maintained, the swept oscillator must be very stable in frequency and be to a high degree free from drift, more especially at the lower frequency end of its range of frequency variation. Thus, for example, in the case of an FM radar system in which the produced beat note frequencies to be analyzed may be of any value between 4 kc./s. and 40 kc./s. and in which the swept oscillator is swept between the limits of 114 kc./s. and 150 kc./s., the frequency of the I. F. amplifier being 110 kc./s. an error of 1% in the frequency of the swept oscillator when that frequency should be 114 kc./s. will produce a displayed range error of $$\frac{1\times 114}{4}=29\% \text{ (approximately)}$$

whereas the same percentage error produced when the swept oscillator frequency should be 150 kc./s. will be only $$\frac{1\times 150}{40}=3.75\%$$

It is therefore exceedingly important that the swept oscillator should be accurate at its predetermined frequency at the lower end of its range of frequency variations. An important use of this invention is for this particular purpose i. e. stabilizing the swept oscillator frequency of an FM radar system with a panoramic receiver at that end of the range swept oscillator frequencies which corresponds to the closest range targets to be handled.

Figure 2A:
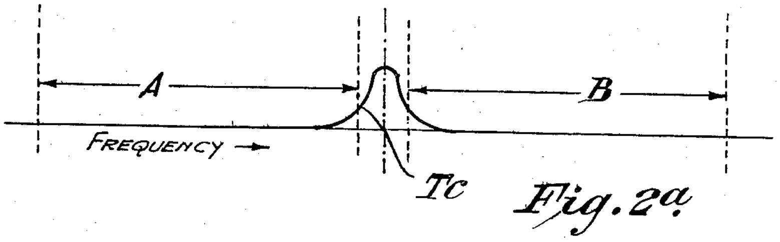
Figure 2B:
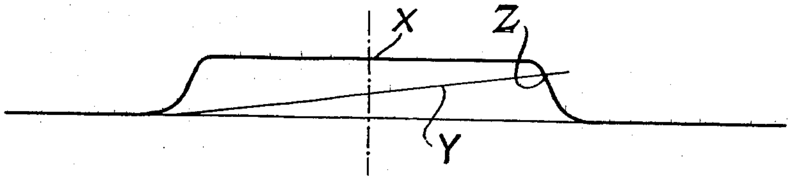

The invention is illustrated in and further explained in connection with the accompanying drawings in which Figure 1 is a block diagram of one embodiment and Figs. 2*a* and 2*b* are explanatory graphical figures.

Referring to Fig. 1, the rectangle 1 represents the swept oscillator of an FM radar system of the panoramic receiver type and supplies its output over lead 2 to the appropriate normally provided mixer of the panoramic receiver and which is included in the receiver-mixer unit represented by the block RM. This unit receives echo signals and signals direct from the transmitter T to produce beat frequency signals and the mixer output is fed to the display cathode ray tube C. R. T. The parts indicated by letter references are all well known and, operating in the conventional manner, require no further description here. Output is also fed from the swept oscillator to a tuned circuit or network 3 which is resonant at a frequency of $F_1-f$ where $F_1$ is the required lower limit of frequency of the swept oscillator 1 and $f$ is approximately one half the bandwidth of the tuned circuit or network 3. The output from the tuned circuit 3 is fed through a buffer stage 4 of the cathode follower type to a diode or other suitable rectifier 5. Output voltage from the rectifier 5 is supplied as control correction bias to a so-called reactance valve 6 which is associated with the swept oscillator and interposed between it and the normally provided time base circuit 7 by which the required sweeping action is obtained. The time base circuit also supplies output over lead 8 to the normally provided cathode ray tube or other display device C. R. T. of the radar system.

The oscillator 1 is so adjusted that, in the absence of applied correcting bias applied, the frequency would sweep into the pass band of the tuned circuit 3 so that maximum correction voltage would be produced. The polarity of the correction voltage is such that with increase in its value it tends to move the mean frequency of the swept oscillator away from the resonant frequency of the tuned circuit. Accordingly the said mean frequency is shifted by the correcting bias voltage so that the swept oscillator just sweeps into the pass band of the tuned circuit when the said bias is reduced to a value which holds the lower limit of the swept oscillator frequencies close to the resonant frequency of the tuned circuit. The requirement is that the lower limit shall not be below the required frequency so that the trace on the cathode ray tube indicator starts always from the same position in order to provide an accurate indication of range.

The cathode follower buffer stage is provided for the purpose of preventing undue damping of the tuned circuit, for the energy continually dissipated in the diode load has to be supplied in short bursts as the swept oscillator sweeps into the pass band of the tuned circuit. With some types of rectifier the buffer amplifier can be dispensed with.

The diode load resistance (not separately shown) is shunted by a condenser (also not shown) large enough to give a time constant which is much longer than the repetition period of sweep of the swept oscillator but not so long as to prevent the correct bias following normal slow drifts.

As will be appreciated the diode is a peak rectifier. Maximum stability of the swept oscillator is obtained if the adjustments are so chosen that (*a*) the correction applied under steady conditions is $1/\sqrt{2}$ of the maximum obtainable bias and (*b*) with no applied correction the opposite limiting frequency is close to the resonant frequency of the tuned circuit, so that a large normal correction is applied. Putting the last point in other words, condition (*b*) involves that the upper limiting frequency of the swept oscillator should just lie in the pass band of the tuned circuit or network on the lower side thereof in the absence of correction, but the correction produced lifts the mean frequency of the swept oscillator so that the lower limiting frequency then lies in the said pass band on the upper side thereof. This is graphically illustrated in Figs. 2*a* and 2*b*. In Fig. 2*a* the range A of frequencies is the possible range of frequencies which the swept oscillator 1 would sweep through were no correction bias applied; TC represents the resonance curve of the tuned circuit 3; and B represents the sweep of the oscillator when stabilised by the correction bias. In Fig. 2*b*, in which control voltage from unit 5 is plotted against the mean frequency of the swept oscillator 1, the curved X represents obtainable correction bias, the inclined line Y represents the required bias and the intersection Z is the working point.

The stability of the controlled limiting frequency is improved by means of this invention by a factor $1+kB$ where $k$ is the swept oscillator frequency sensitivity in c./s. per volt of applied correction bias and B is the tuned circuit-rectifier sensitivity in volts per c./s. drift. To give practical figures $k$ might be 4000 and B might be 0.01, which would give an improvement factor of 40.

I claim:

1. A frequency modulated radar system of the panoramic receiver type comprising a transmitter transmitting frequency modulated waves, a receiver receiving the transmitted waves after reflection from a target and mixing said received waves with frequency modulated waves then being transmitted to produce a beat frequency which will be a function of the range of the target and contain frequency components dependent upon the radial movement of said target with respect to said transmitter and receiver and a swept oscillator whose oscillations are mixed with said beat frequency to sweep the same over a predetermined range, said radar system including also means providing limitation of the frequency swing of said swept oscillator at least at one end of said frequency swing, said means providing limitation including a resonant circuit tuned to a frequency closely adjacent to a predetermined desired limiting frequency, means for feeding output from said swept oscillator to said resonant circuit, a control circuit fed from said resonant circuit, and means responsive to said control circuit for controlling the frequency of said swept oscillator when and only when said swept oscillator approaches said limiting frequency whereby it is prevented from passing said limiting frequency.

2. A frequency modulated radar system as set forth in claim 1 wherein the control circuit includes a rectifier for rectifying the output from said resonant circuit and wherein said responsive means is responsive to the rectified output from said control circuit.

3. A frequency modulated radar system of the panoramic receiver type having a swept oscillator of the reactance valve type and including a resonant network tuned to a frequency closely adjacent a predetermined desired limiting frequency for said swept oscillator, means for feeding the output from said swept oscillator to said resonant network, a control circuit including a rectifier fed from said resonant network, and means for applying the output rectified potential from said rectifier to the reactance valve of said oscillator to control the frequency of the oscillator when and only when said swept oscillator approaches said limiting frequency whereby it is prevented from passing said limiting frequency.

4. A frequency modulated radar system of the panoramic receiver type having a swept oscillator of the reactance valve type and including a resonant network tuned to a frequency closely adjacent a predetermined desired limiting frequency for said swept oscillator, means for feeding the output from said swept oscillator to said resonant network, a control circuit including a rectifier fed from said resonant network, and means for applying the output rectified potential from said rectifier to the reactance valve of said oscillator to control the frequency of the oscillator whereby when said swept oscillator approaches said limiting frequency it is prevented from passing said limiting frequency.

5. A frequency modulated radar system as set forth in claim 4 wherein the swept oscillator includes a separate reactance valve associated with the oscillator valve and wherein the rectified potential from the rectifier is applied to said separate reactance valve.

References Cited in the file of this patent

UNITED STATES PATENTS

| | | |
|---|---|---|
| 2,114,036 | Smith et al. | Apr. 12, 1938 |
| 2,296,962 | Tunick | Sept. 29, 1942 |
| 2,389,025 | Campbell | Nov. 13, 1945 |
| 2,473,790 | Crosby | June 21, 1949 |
| 2,527,523 | Borst | Oct. 31, 1950 |
| 2,547,890 | Rubin | Apr. 3, 1951 |